P. ANDREOTTA.
CYCLE VEHICLE DRIVE GEAR.
APPLICATION FILED SEPT. 8, 1917.

1,289,597.

Patented Dec. 31, 1918.
2 SHEETS—SHEET 1.

INVENTOR
Prospero Andreotta
BY
Oscar Geller
HIS ATTORNEY.

P. ANDREOTTA.
CYCLE VEHICLE DRIVE GEAR.
APPLICATION FILED SEPT. 8, 1917.
1,289,597.
Patented Dec. 31, 1918.
2 SHEETS—SHEET 2.
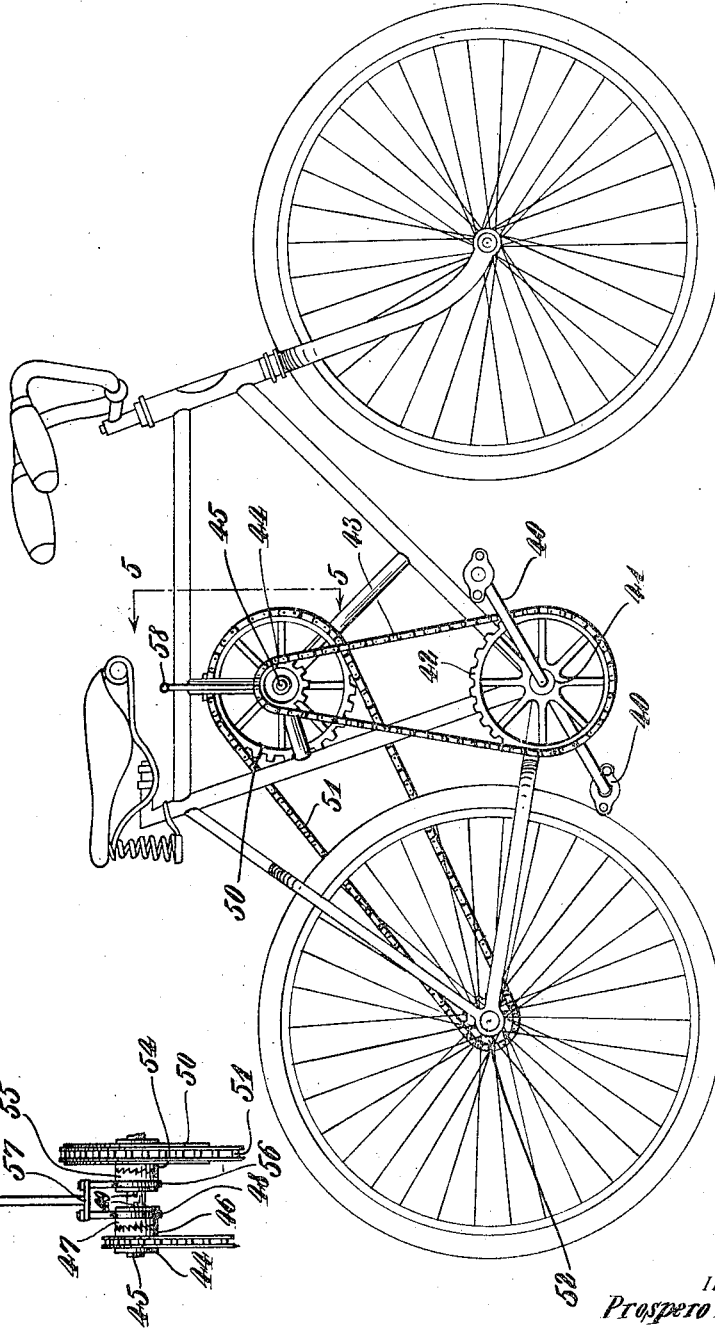
INVENTOR
Prospero Andreotta
BY
Oscar Geier
HIS ATTORNEY

UNITED STATES PATENT OFFICE.

PROSPERO ANDREOTTA, OF BROOKLYN, NEW YORK.

CYCLE-VEHICLE DRIVE-GEAR.

1,289,597.  Specification of Letters Patent.  Patented Dec. 31, 1918.

Application filed September 8, 1917. Serial No. 190,407.

*To all whom it may concern:*

Be it known that I, PROSPERO ANDREOTTA, subject of the King of Italy, resident of Brooklyn, county of Kings, and State of New York, have invented certain new and useful Improvements in Cycle-Vehicle Drive-Gear, of which the following is a specification.

This invention relates to improvements in power transmission as applied to vehicles of the cycle type, and has as its principal object the provision of means whereby power applied to the vehicle, either by a motor or pedally operated means, may be engaged or disengaged in a convenient and expeditious manner, thereby preventing accident and permitting the vehicle to descend an incline without the expenditure of energy.

These and other like objects are attained by the novel construction and combination of parts hereafter described and shown in the accompanying drawings, forming a material part of this disclosure, and in which—

Fig. 4 is a side elevational view showing a pedally operated type of bicycle, and Fig. 5 is a front end view taken on line 5—5 of Fig. 4.

Figure 1:
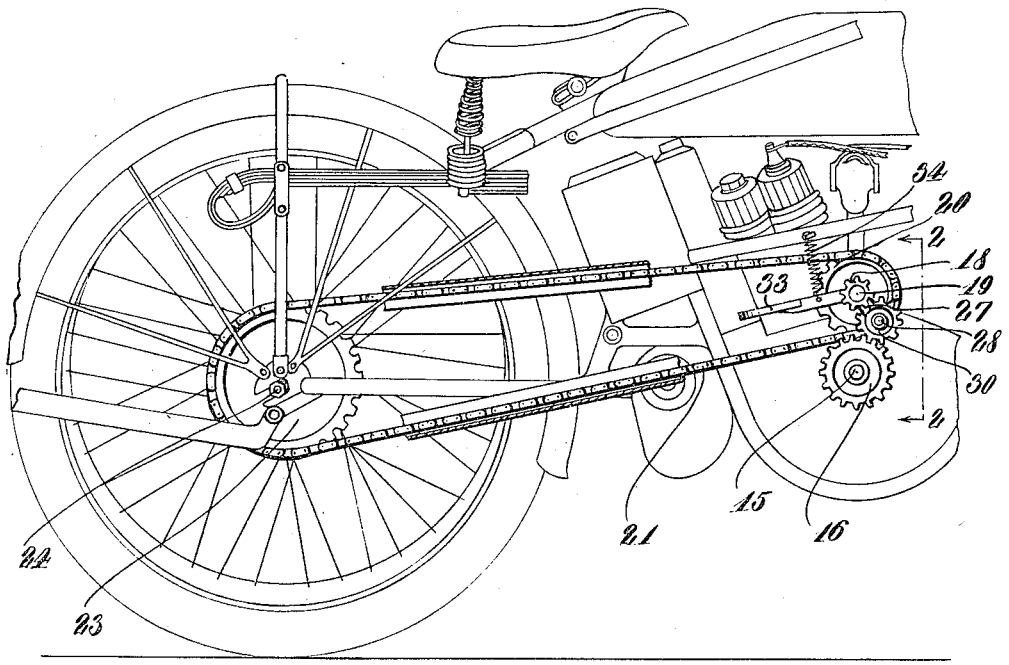
Figure 1 is a fragmental side elevational view, showing a conventional type of motor cycle and indicating the application of the invention.
Figure 2:
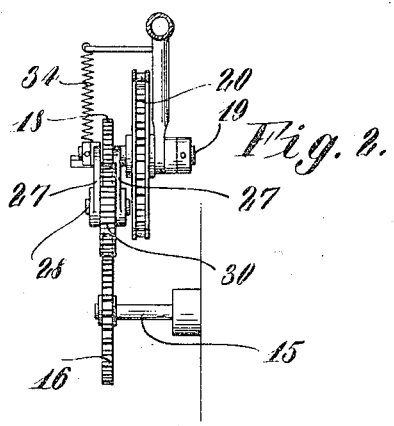
Fig. 2 is a partial front and sectional view, the section being taken on line 2—2 of Fig. 1.
Figure 3:
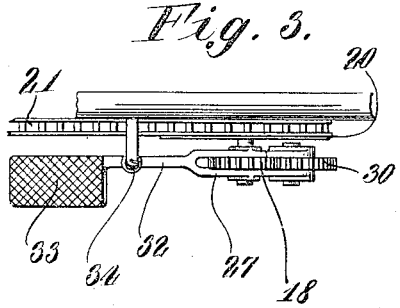
Fig. 3 is a top plan view of the same.

In Figs. 1, 2 and 3, the shaft 15, extending out from the motor has attached to it a spur gear 16, a similar spur gear 18 being free to revolve upon a spindle 19, parallel with the motor shaft 15, there being secured alongside the gear 18 a sprocket 20, over which runs a chain 21, to a rear sprocket 23, rigidly engaged upon the drive shaft 24 of the vehicle.

Also loosely mounted on the spindle 19, are lever arms 27, in which is journaled a pin 28, having mounted upon it an intermediate gear 30, adapted to engage with the gear 16, always in engagement with the gear 18, the lever arms 27 connecting with a stem 32 terminating in a pedal 33, the same being disposed substantially horizontal and at an angle to the arms 27, and is held normally upward by the tension spring 34, engaged between the stem 32, and a fixed part of the frame of the vehicle, the arrangement being such that as the pedal 33 is depressed the intermediate gear 30 is swung outwardly upon the spindle 19, and unmeshed from engagement with the gear 16 so that either may freely rotate, and it will be obvious that upon releasing the pedal 33, the spring 34 will bring the gear 30 into engagement with the driving gear 16, so that motion is transmitted to the rear shaft, and the vehicle is caused to advance under the power given by the motor.

Figs. 4 and 5 show a similar device attached to an ordinary pedally operated bicycle, in which the pedals 40 are secured to the shaft 41, having upon it the driving sprocket 42, communicating motion through the chain 43, to another sprocket 44, mounted upon a spindle 45, and having its inner hub formed with a clutch element 46, engageable with a mating clutch sleeve 47, provided with teeth and held normally in engagement by the fork 48, slidably mounted on the spindle 45, and rotated by means of the keys 49.

Also on this spindle is a larger sprocket 50 communicating motion through the chain 51 to the driving sprocket 52, the sprocket 50 having a clutch element 54, engageable with a mating clutch 55, operable by the fork 56, both of the forks 48 and 56 being engaged by a link 57, operated by the knob 58, in such manner that as the knob 58 is turned, the clutch elements 47 and 55 are moved outwardly so as to engage with the elements 46 and 54, thereby communicating motion between the sprockets 44 and 50, and conversely, if the handle 58 be oppositely turned the sprockets are disengaged and no power is transmitted to the rear shaft 52.

From the foregoing it will be seen that disengagement will be effected between the shaft 41 and the driving wheels of the vehicle in an effective and simple manner by operating the extending handle 58.

Having thus described my invention what I claim as new and desire to secure by Letters Patent, is:

In a bicycle drive, the combination with the frame of a machine, and a bracket mounted thereon, and a driving sprocket driven by the pedals, of a shaft rotatably mounted in said sprocket, a driven sprocket rotatable on said shaft, a driving sprocket rotatable on said shaft, connections between said driving sprocket and the driving wheels of the vehicle, clutch elements formed on the inner hub of said driving sprocket, other clutch elements formed on the inner hub of said driven sprocket, inner clutch elements keyed to slide upon said shaft, and means for moving said inner clutch elements into or out of engagement with the clutch elements on said hubs.

In testimony whereof I have affixed my signature.

PROSPERO ANDREOTTA.